Aug. 25, 1953 W. H. REICHARD 2,650,295

CODED TRACK CIRCUIT SIGNALING SYSTEM

Filed Aug. 19, 1948

6 Sheets-Sheet 1

INVENTOR.
W. H. Reichard,
BY
Neil W. Rlstow,
his ATTORNEY

CODED TRACK CIRCUIT SIGNALING SYSTEM iled Aug. 19, 1948 6 Sheets-Sheet 2

INVENTOR.
W. H. Reichard,
BY Neil W. Ristow,
his ATTORNEY

CODED TRACK CIRCUIT SIGNALING SYSTEM

Filed Aug. 19, 1948 6 Sheets-Sheet 3

INVENTOR.
BY W. H. Reichard
Neil W. Preston
his ATTORNEY

INVENTOR.
W. H. Reichard,
BY Neil D. Preston,
his ATTORNEY

INVENTOR.
BY W. H. Reichard,
Neil D. Preston,
his ATTORNEY

INVENTOR.
BY W. H. Reichard,
Neil D. Preston,
his ATTORNEY

Patented Aug. 25, 1953

2,650,295

UNITED STATES PATENT OFFICE 2,650,295

CODED TRACK CIRCUIT SIGNALING SYSTEM

Wade H. Reichard, Rochester, N. Y., assignor to General Railway Signal Company, Rochester, N. Y.

Application August 19, 1948, Serial No. 45,093

6 Claims. (Cl. 246—34)

Figure 1A:
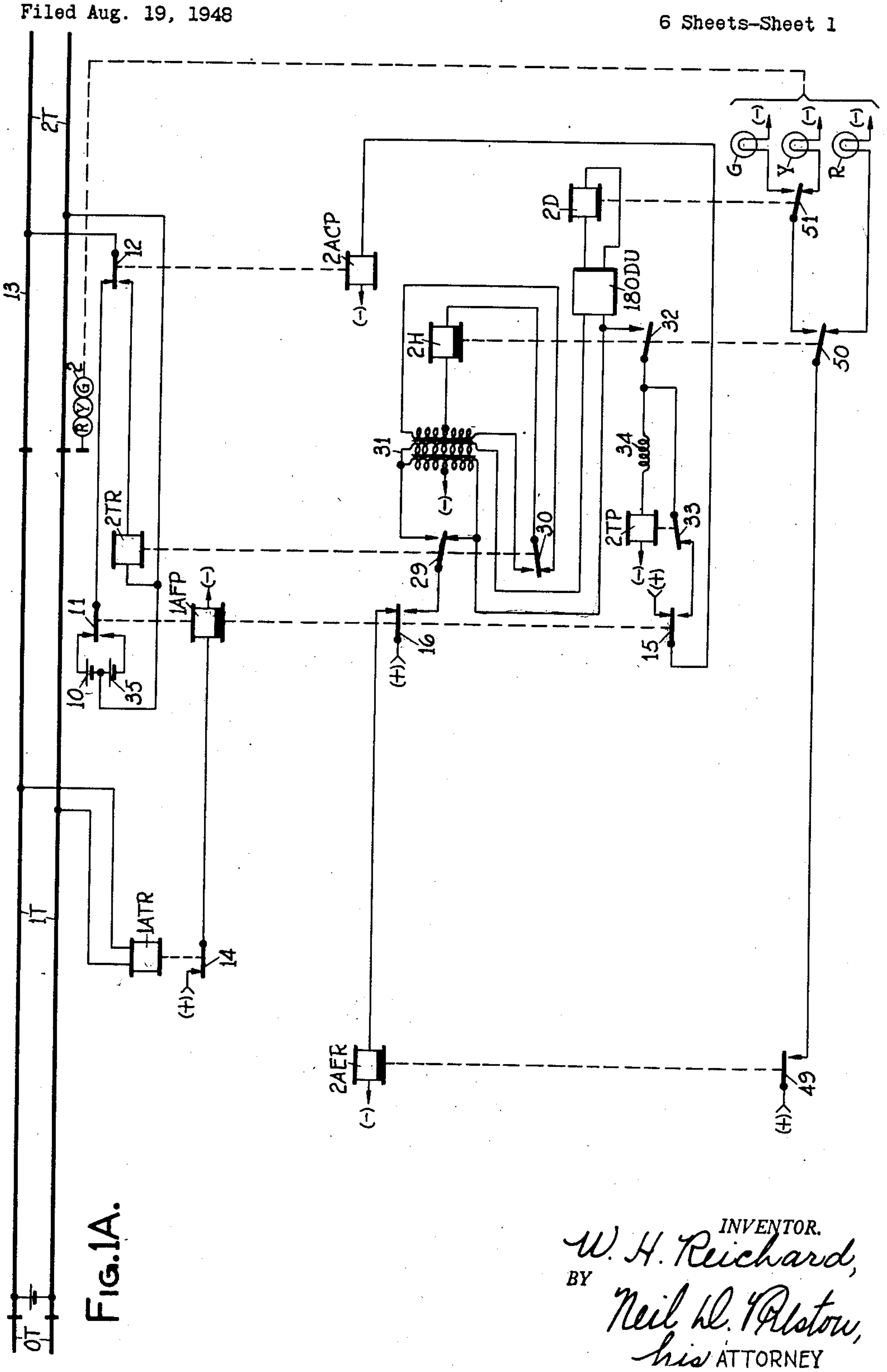
Figure 1B:
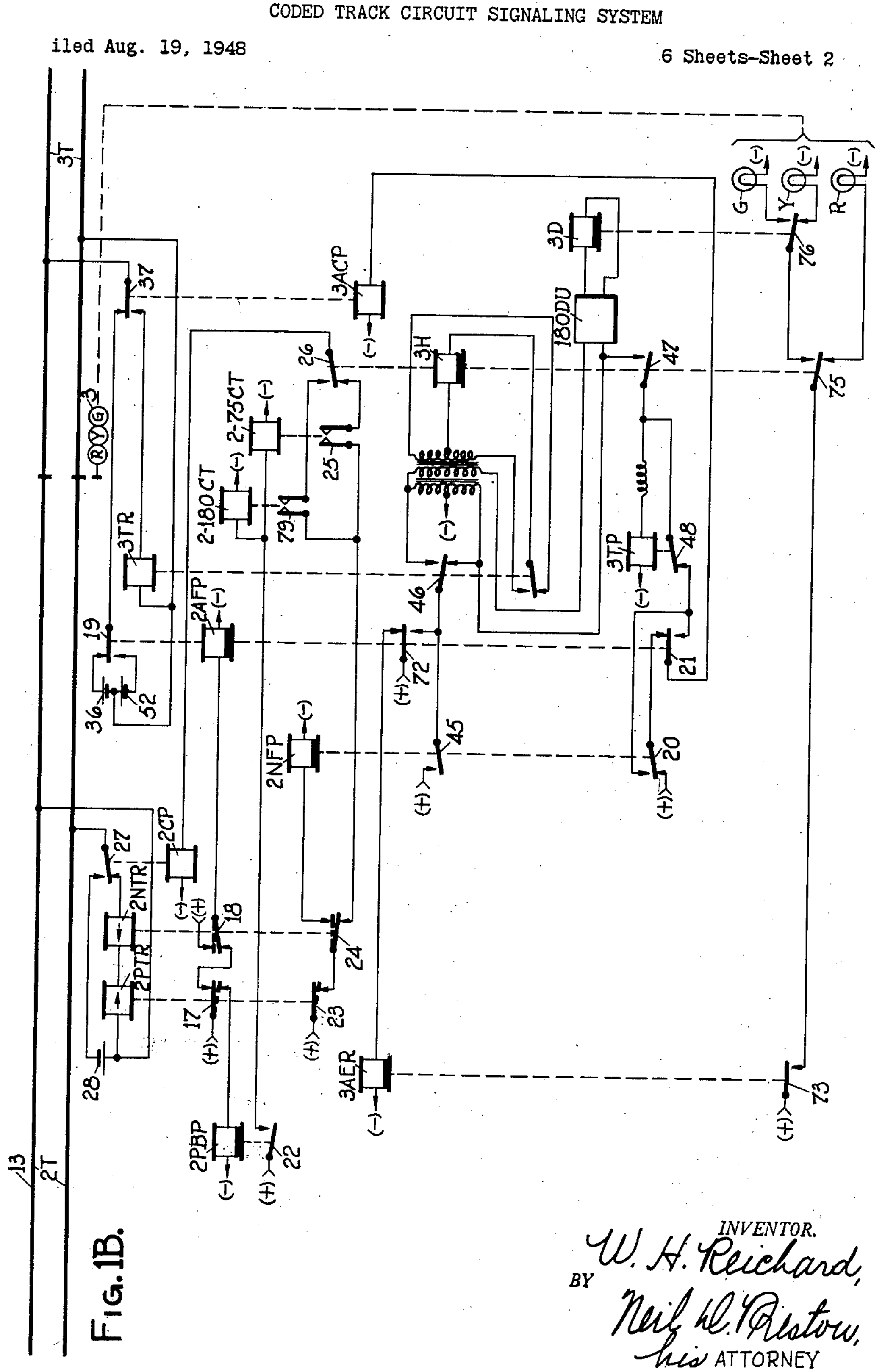

This invention relates to coded track circuit signalling systems for railroads, and it more particularly pertains to such systems wherein track circuit coding apparatus is normally inactive but is automatically initiated for the respective track sections or blocks as a train progresses.

A system of this type is disclosed in my prior application Ser. No. 567,995, filed December 13, 1944, and the present invention is to be considered as providing improvements in the systems disclosed in that application, and no claim is made herein to that which is disclosed in my prior application.

In systems of the character of my above mentioned prior application and of the present invention, a stretch of track is divided into blocks by the usual insulated joints and a signal is provided for governing entrance to each of the blocks for a given direction of traffic. Each of the blocks is normally energized by steady energization from its entrance end, and the presence of this steady energy maintains a driven code transmitter at the exit end of that block normally inactive. Upon approach of a train, a tumble-down of the condition of normal energization is initiated for the respective blocks in advance and such tumble-down is arrested after initiating coding in a predetermined number of blocks ahead of the train so as to permit the clearing of the signal the train is approaching. As a means for limiting the propagation of starts to a predetermined number of blocks in advance of a train, distinctive conditions of energization such as inverse code of a selected polarity are applied at the entrance end of each of these predetermined number of blocks as a means for arresting the tumble-down operation at the proper point. In order that there may be time for inverse code to become established for the purpose of arresting the tumble-down, the rate of tumble-down from block to block is governed so as to allow time for the arresting means to become effective subsequent to initiation of the coding in each block before coding in the next block in advance is initiated.

An object of the present invention is to initiate the propagation of starts for another block in advance each time that a train enters a block, and thus sufficient coding is established to permit each signal to indicate clear upon acceptance by a train of the next signal in the rear. To accomplish this mode of operation for three indication signalling, coding must always be active for the next two unoccupied blocks in advance of a train.

Another object of the present invention is to limit the propagation of starts of coding in the respective blocks to two unoccupied blocks in advance of a train by transmitting an inverse code of one polarity in the first of the two blocks from the entrance end, and transmitting an inverse code of the opposite polarity in the second of the two blocks from its entrance end.

Another object of the present invention is to initiate coding in a block either by shunting or removing steady or inverse code energization in the block in the rear, but not until after a predetermined time interval such as is sufficient for arresting the propagation of the initiation of the coded track circuit apparatus.

Another object of the present invention is to render the approach lighting of each signal responsive to the entrance of a train into the block immediately in approach thereof, but not until after sufficient time has elapsed to permit the building up of code to clear that signal subsequent to initiation of coding in another block in advance. It is thus provided that the entrance of a train into a block both initiates coding in another block in advance and provides approach control for the signal immediately in advance, but the approach energization of the signal is delayed, until the code rate has had time to increase to a clear signal control rate in accordance with the coding having been rendered effective in another block.

Other objects, purposes, and characteristic features of the present invention will be in part obvious from the accompanying drawings, and in part pointed out hereinafter in the specification and claims.

In describing the invention in detail, reference will be made to the accompanying drawings in which parts having similar structural characteristics and functions are designated by similar letter reference characters, generally made distinctive by preceding numerals indicative of the respective signals or blocks with which such parts are more directly associated, and in which;

Figs. 1A to 1D inclusive, when placed end to end respectively, illustrate one embodiment of the present invention as applied to a typical stretch of track provided with three indication signalling for a single direction of traffic; and Figs. 2A to 2G inclusive illustrate by track diagrams and sequence charts the coded track circuit conditions that are set up and the mode of operation that is involved under specific typical operating conditions to be encountered in practice.

The system is illustrated by schematic wiring diagrams which are used more particularly to facilitate the disclosure of the invention as to its general organization and mode of operation than to illustrate the specific construction and arrangement of parts that would be employed in practice. The symbols (+) and (−) are used to indicate connections to the respective positive and negative terminals of batteries or other suitable sources of direct current.

With reference to Figs. 1A to 1D inclusive, a typical portion of trackway for this embodiment of the present invention is illustrated as being divided into blocks 2T, 3T, 4T, and 5T by suitable insulated joints. The track section 1T at the left-hand end of the trackway is provided as a starting track section and it may be a part of the automatic signalling territory, or it may be included as part of an interlocking organization or yard from which entrance to the trackway may be made in accordance with particular conditions to be encountered in practice.

Signals 2, 3, 4, and 5 are provided for governing entrance to the track sections 2T, 3T, 4T, and 5T respectively. Although the signals illustrated are of the color light type having individual red, yellow, and green light units for providing respective danger, caution, and clear signal indications, it is to be understood that other conventional types of signals such as semaphore signals, position-light signals, or search light signals could as well be employed in accordance with the requirements of practice.

A coded track circuit is provided for each of the blocks 2T to 5T inclusive, and each of the coded track circuits includes a code following track relay TR at the entrance end of the block for receiving driven code pulses. Respective positive and negative code following relays PTR and NTR are provided in each coded track circuit at the exit end of each block for receiving inverse code pulses of respective positive and negative polarity. The starting track section 1T has a conventional steadily energized track circuit including a normally energized approach track relay 1ATR. Suitable direct current energization means is provided at both ends of the respective coded track circuits such as the batteries which have been illustrated, separate batteries being provided at the entrance ends of the respective blocks for use in selectively applying inverse code pulses of one polarity or the other to the track rails. The code responsive relays that are included in the track circuit are preferably of the well known biased polar type so as to be responsive only to energization of the particular polarity that is intended for their energization. It is therefore provided by the use of relays of this character that the positive and negative relays PTR and NTR respectively can be connected in series in the track circuit but with opposite polarities so that one relay is responsive to positive energization of the track circuit, and the other relay is responsive to negative energization of the track circuit.

Driven code transmitting apparatus is provided at the exit end of each of the coded track circuits comprising suitable pulse forming oscillators 180CT and 75CT for forming pulses at respective 180 and 75 rates per minute in accordance with the usual practice in coded track circuits. A suitable oscillator of this character which may be employed is disclosed in the patent to O. S. Field, Pat. No. 2,351,588, dated June 20, 1944. A driven code transmitter relay CP is associated with the exit end of each of the coded track circuits, and such relay is effective to transmit pulses at a selected 75 or 180 rate when it is rendered active upon the approach of a train.

Decoding apparatus is provided at the entrance end of each of the coded track circuits comprising, a decoding transformer, a home relay H, a tuned decoder 180DU, and a distant relay D. The relays D and H are made sufficiently slow in dropping away to be steadily held up in response to successive pulses of the associated track relay TR, the relay D being controlled through the tuned decoding circuit 180DU so as to be responsive only to the reception of a 180 driven code.

An inverse code transmitter relay ACP is provided at the entrance end of each of the coded track circuits for transmitting an inverse code, such relay being rendered active for transmission of inverse code pulses during the "off" periods of a driven code received at that end of the block. Each relay ACP is steadily energized under normal conditions to apply steady energy to the track rails of its associated block. A relay TP is provided for each of the inverse code transmitters as a means for terminating the respective inverse code pulses.

Inverse code responsive apparatus is provided at the exit end of each of the coded track circuits for governing the transmission of driven codes in that block and inverse codes in the block in advance comprising relays AFP, NFP, and PBP. These relays have slow drop away characteristics so as to cause them to be steadily picked up in response to the pulsing of one or the other of the inverse code receiving relays at the associated end of the block. The relay AFP of this group is used in pole changing the track circuit of the block in advance and when deenergized thus initiates coding in that block. This relay is made sufficiently slow in dropping away to provide time for the inverse code to be established in its associated track section to arrest propagation of starts for the coded track circuits before its dropping away becomes effective to initiate coding apparatus in a block in advance. An approach control relay AER is provided for each of the signals as a means of governing the energization of that signal so that it is normally dark, but is illuminated upon entrance of a train into the block immediately in approach thereof. Each of the relays AER has sufficiently slow drop away characteristics to permit the start of coding in an advance block and the resultant building up of code in the block immediately in advance of the associated signal to a 180 code so that the energization of the associated signal by the dropping away of the relay AER is not effective prior to a change in the code rate governing that signal as effected by the initiation of coding in an advance block. The relative timing of the drop away characteristics of the relays AFP and AER that is desirable will be more readily apparent as the description progresses, and as reference is made to the sequence and timing charts.

Having thus considered the general organization of the system for the embodiment of the present invention illustrated in Figs. 1A to 1D inclusive, consideration will now be given as to the circuit organization in accordance with the consideration of typical modes of operation to be encountered in practice.

*Operation*

Figure 2A:
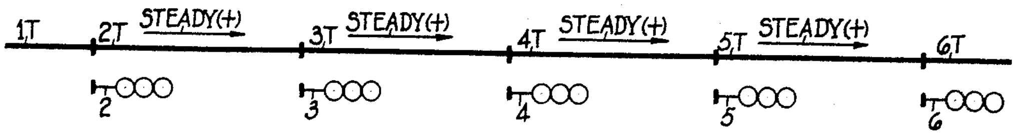
Figure 2B:
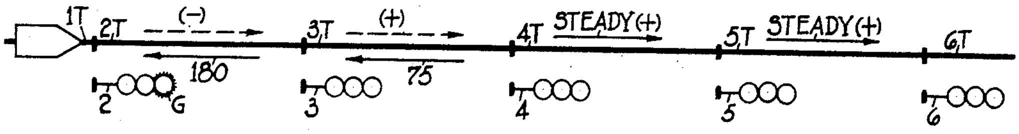

The conditions of the apparatus when it is unaffected by the approach of a train are considered to be normal, and under these conditions steady energization is applied to the track rails of the respective blocks at the entrance ends thereof as is illustrated in the track diagram of Fig. 2A. Thus the track rails of the block 2T (see Fig. 1A), for example, are energized with positive polarity from the battery 10 at the entrance and of the block through front contacts 11 and 12 of the relays 1AFP and 2ACP respectively. For the purpose of facilitating the description of the present invention the polarity of energization of a track circuit is considered as corresponding to the battery connection to the upper rail in the drawings. Thus, for example, the track section 2T is said to be energized with a positive polarity under normal conditions by the connection of the positive terminal of the battery 10 to the top rail 13.

The relay 1AFP is normally energized in accordance with the closure of front contact 14 of the normally energized track relay 1ATR for the starting section 1T; and the transmitter relay 2ACP is steadily energized at this time in accordance with the closure of front contact 15 of relay 1AFP. The steady energization of the relay 1AFP under normal conditions is also effective by closure of its front contact 16 to maintain the approach lighting control relay 2AER energized so as to maintain the signal 2 normally dark. It will be readily apparent that corresponding approach control apparatus is somewhat similarly conditioned at the entrance end of each of the blocks.

At the exit end of the block 2T, for example, the relay 2PTR is steadily energized in response to the positive polarity applied to the track rails at the entrance end of that block, and the closure of its front contact 17, with the back contact 18 of relay 2NTR closed, establishes a circuit for the steady energization of the relay 2AFP so that this relay maintains steady energy of positive polarity applied to the rails of the block 3T at the entrance end thereof through its front contact 19. It will be noted that the signals are all normally dark because of the normal energization of the associated approach lighting relays AER.

The negative front repeater relays NFP are normally deenergized because of the polarity of the steady energization being positive, and thus in accordance with the relays NFP being deenergized and the relays AFP being energized, the code transmitter relays ACP at the entrance ends of the respective coded track circuits are all steadily energized. For example, the relay 3ACP is steadily energized to apply steady energy through its front contact 37 to the track rails of the block 3T at the entrance end thereof. The circuit for the energization of relay 3ACP under these conditions extends from (+), including back contact 20 of relay 2NFP, front contact 21 of relay 2AFP, and winding of relay 3ACP, to (−).

For a consideration of the mode of operation of the system when a train enters the stretch of track illustrated in Figs. 1A to 1D inclusive, it will be assumed that a train enters the starting track section 1T (see Fig. 1A) and shunts the track relay 1ATR so as to cause that relay to drop away and open front contact 14 which is included in the control circuit of the front repeater relay 1AFP. The relay 1AFP in dropping away opens its front contact 15 through which the transmitter relay 2ACP has been normally energized for application of steady energy to the track rails of the block 2T at its entrance end. Thus the relay 2ACP in dropping away removes energy from the block 2T by the opening of front contact 12.

At the exit end of the block 2T, the relay 2PTR (see Fig. 1B) is dropped away as a result of the removal of the steady energy, and this relay in dropping away closes a pick up circuit for the positive back repeater relay 2PBP at back contact 17. The picking up of this relay establishes obvious circuits by the closure of front contact 22 for the energization of the code oscillators 2—180CT and 2—75CT.

The relay 2CP becomes active to transmit a 75 driven code as selected by the relay 3H being deenergized. Relay 2CP is energized for each pulse of the oscillator 2—75CT by a circuit extending from (+) including, back contact 23 of relay 2PTR, back contact 24 of relay 2NTR, contact 25 of oscillator 2—75CT, back contact 26 of relay 3H, and winding of relay 2CP, to (−). Each time this relay is picked up, the closure of its front contact 27 connects the track battery 28 across the track rails for the transmission of a driven code pulse. It will be noted that the positive terminal of the battery 28 is connected directly to the top rail at the exit end of the block 2T. During each "off" period between the driven code pulses, the back contact 27 of the relay 2CP is effective to connect the relays 2PTR and 2NTR in series across the track rails so that the relay 2PTR is responsive to positive inverse code pulses, and the relay 2NTR is responsive to negative inverse code pulses.

At the entrance end of the block 2T (see Fig. 1A), the track relay 2TR becomes active in response to the respective driven code pulses received because it has become connected across the track rails by the closure of back contact 12 in accordance with the deenergization of the relay 2ACP as as been described. The pulsing of the contacts 29 and 30 of the relay 2TR provides for the energization of the relay 2H through the decoding transformer 31, the pulsing of the contact 29 being effective to energize the primary winding of the transformer 31 alternately first in one direction and then the other, and the pulsing of contact 30 being effective to commutate the output of the transformer 31 so as to energize the relay 2H with direct current.

The relay 2H upon picking up, by the closure of its front contact 32, establishes a circuit to render the relay 2ACP active for the transmission of inverse code pulses. Thus the relay 2ACP becomes energized each time the back contact of relay 2TR is closed by a circuit extending from (+) including, back contact 16 of relay 1AFP, back contact 29 of relay 2TR, front contact 32 of relay 2H, back contact 33 of relay 2TP, back contact 15 of relay 1AFP, and winding of relay 2ACP, to (−). At the same time the relay 2TP is energized through the inductance 34, but the energization of the relay 2TP through the inductance 34 delays the picking up of the relay 2TP until the desired time for termination of the inverse code pulse. Thus each inverse code pulse is terminated by the opening of front contact 12 of relay 2ACP in response to the deenergization of relay 2ACP by the opening of its circuit at back contact 33 when the relay 2TP becomes picked up. The pick up circuit for the relay 2TP extends from (+) including, back contact 16 of relay 1AFP, back contact 29 of relay 2TR, front contact 32 of relay 2H, inductance 34, and winding of relay 2TP, to (−). It will be noted that the inverse code pulses transmitted at the entrance end of the block 2T at this time are of negative polarity because the relay 1AFP is dropped away, and thus the contact 11 selects the battery 35 rather than the battery 10 for connection across the track rails during each inverse pulse. The negative terminal of the battery 35 is connected to the upper rail of the block 2T under these conditions, and thus an inverse code of negative polarity is transmitted.

The reception at the exit end of the block 2T of the inverse code pulses of negative polarity renders the relay 2NTR (see Fig. 1B) active in response to the respective pulses, and the pulsing of front contact 18 of that relay maintains relay 2AFP in its picked up position and thus maintains positive polarity applied to the track rails of the block 3T from the battery 36.

The pulsing of contact 24 of relay 2NTR causes the picking up of the negative front repeater relay 2NFP, and the picking up of that relay is effective by the opening of its back contact 20 to remove the steady energization from the relay 3ACP which is associated with the entrance end of the block 3T. The relay 3ACP thus becomes dropped away and opens its front contact 37 to remove the steady energy from the block 3T and thus initiate the transmission of driven code from the exit end of that block.

Figure 1C:
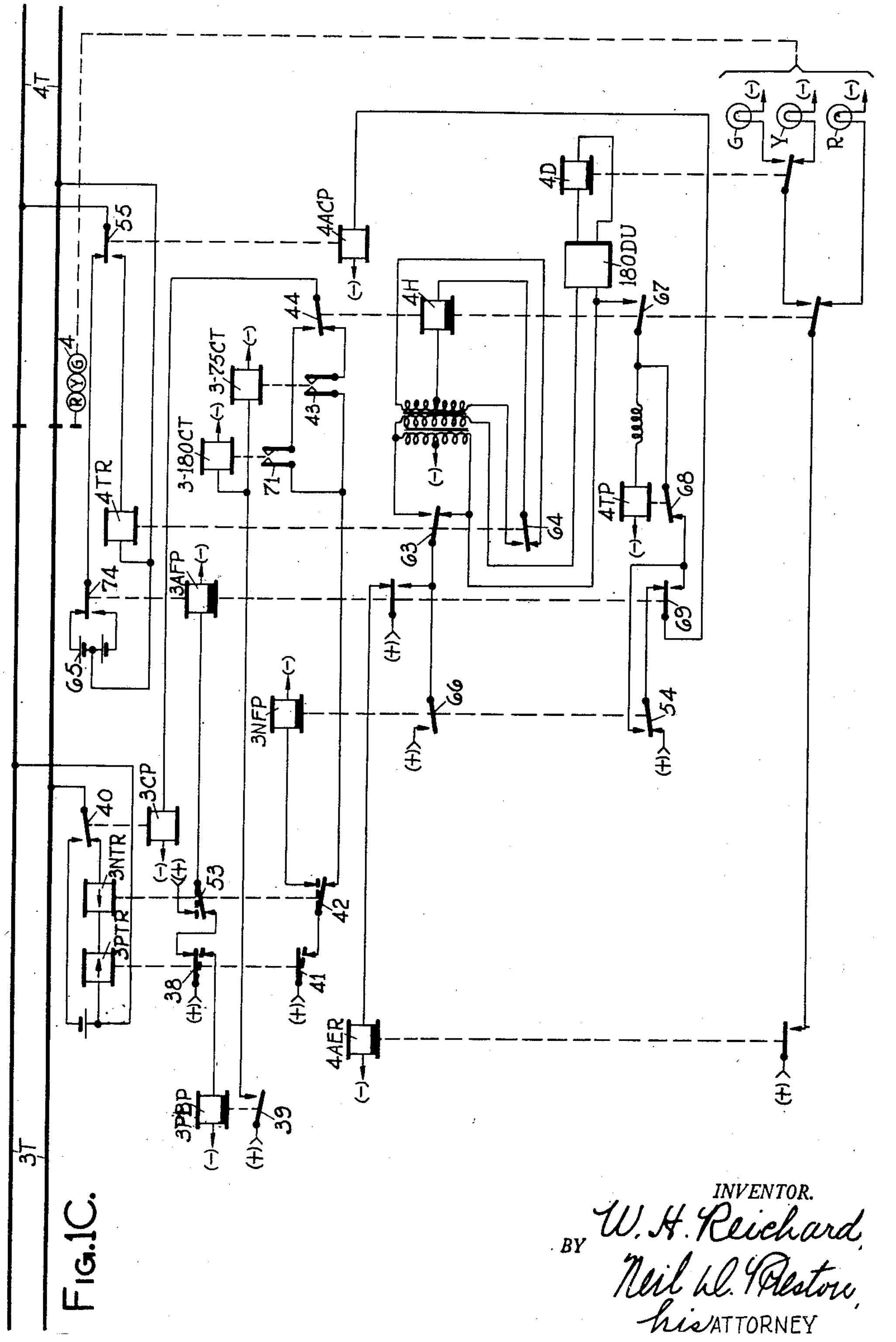
Figure 1D:
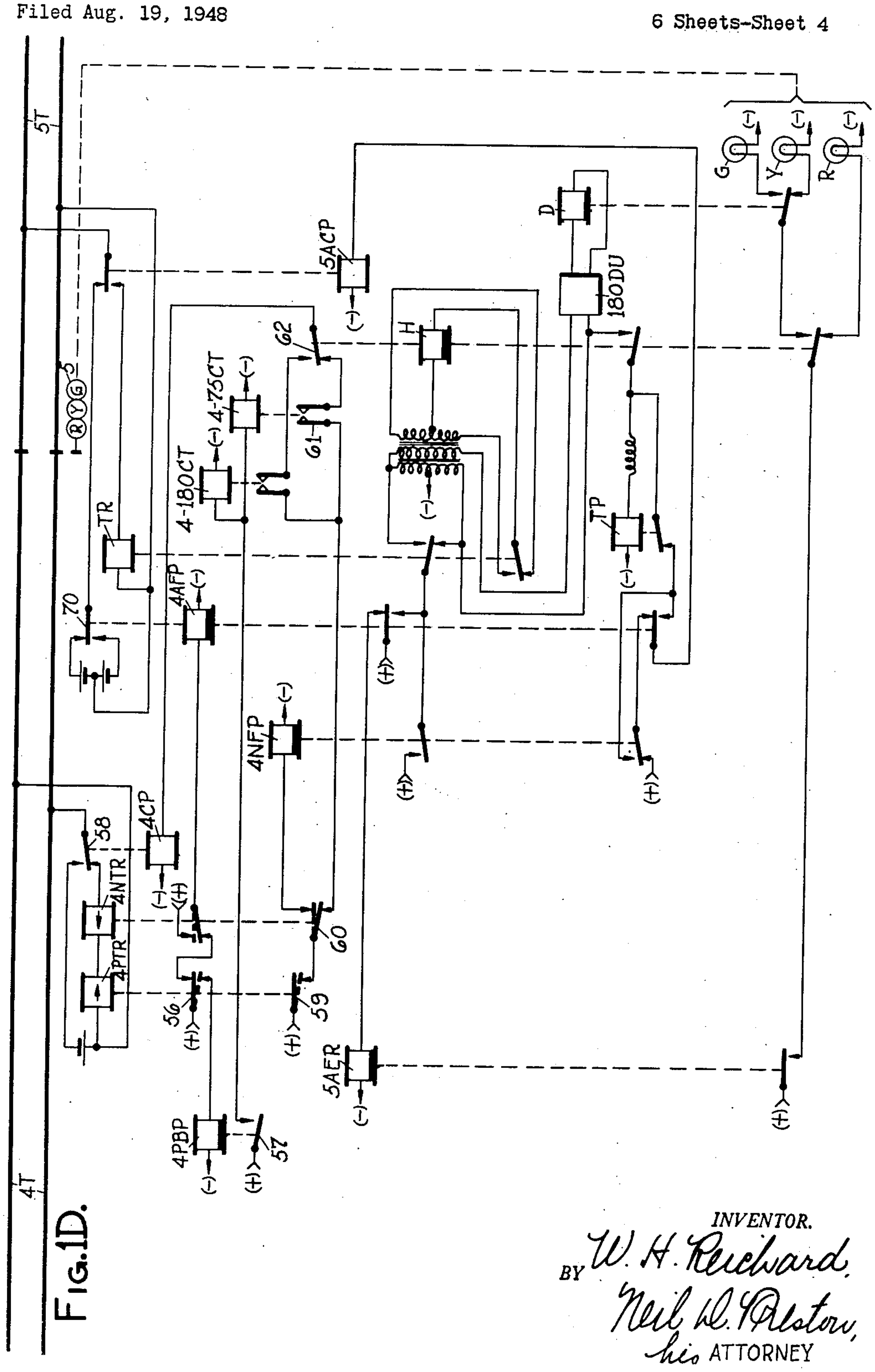

With reference to Fig. 1C, the relay 3PTR is dropped away upon removal of steady energy in the block 3T, and the dropping away of that relay is effective by the closure of its back contact 38 to energize the relay 3PBP and thus in turn initiate the coders 3—180CT and 3—75CT by the closure of front contact 39. With the oscillators initiated and with relay 3PTR deenergized, the relay 3CP becomes active to pulse its front contact 40 for the transmission of a 75 driven code. Relay 3CP is energized for each pulse under these conditions by a circuit extending from (+) including, back contact 41 of relay 3PTR, back contact 42 of relay 3NTR, contact 43 of oscillator 3—75CT, back contact 44 of relay 4H, and winding of relay 3CP, to (−).

The reception at the entrance end of the block 3T (see Fig. 1B) of the 75 driven code is effective to pick up the relay 3H in a manner comparable to that which has been described for the picking up of relay 2H at the entrance end of the block 2T, and the picking up of relay 3H renders the relay 3ACP active to transmit inverse code pulses. Relay 3ACP is energized for each inverse code pulse under these conditions by a circuit extending from (+) including, front contact 45 of relay 2NFP, back contact 46 of relay 3TR, front contact 47 of relay 3H, back contact 48 of relay 3TP, front contact 20 of relay 2NFP, front contact 21 of relay 2AFP, and winding of relay 3ACP, to (−). Because of the relay 2AFP being maintained picked up at signal 3, the closure of its front contact 19 provides that the inverse code pulses applied to the entrance end of the track circuit for the block 3T are of positive polarity.

The reception of this inverse code of positive polarity at the exit end of the block 3T maintains the relay 3AFP (see Fig. 1C) picked up to apply energy of positive polarity to the entrance end of the block 4T by the pulsing of contact 38 of relay 3PTR, and the pulsing of this contact is also effective to maintain the positive back repeater relay 3PBP steadily picked up so as to maintain the code oscillators and the driven code transmitter relay 3CP active for transmission of a 75 code.

Because of the slow drop away characteristics of the relay 3AFP, this relay has been maintained picked up during the time required to initiate the inverse code transmitter for the block 3T subsequent to the removal of steady energy from that block so as to prevent further propagation of coded track circuit starts until the polarity is changed in the block 3T. In other words, with the relay 3AFP maintained picked up, the picking up of the relay 3NFP is required in response to negative energization of the block 3T at its entrance end in order that the steady energization of the relay 4ACP, and of the block 4T, can be terminated.

At the signal 3 (see Fig. 1B) the picking up of relay 3H in response to the 75 driven code is effective by the shifting of its contact 26 to substitute the contact 79 of the oscillator 2—180CT for the contact 25 of the oscillator 2—75CT in the circuit for relay 2CP so as to increase the code rate in the block 2T from a 75 driven code to a 180 driven code. This increase in code rate is effective to energize the relay 2D (see Fig. 1A) at the entrance end of the block 2T through its tuned circuit 180DU and through the decoding transformer 31 to condition the signal 2 to provide a green aspect when the approach lighting of that signal becomes effective.

The slow drop away approach lighting relay 2AER has become deenergized in accordance with the dropping away of the relay 1AFP, but because of the slow drop away characteristic of the relay 2AER, it is maintained picked up until the code rate has had time to change from a 75 rate to a 180 rate as has been described so that there will be no yellow aspect displayed by the signal 2 momentarily during the building up of the code in the block 2T. The green lamp G of signal 2 is energized when the approach lighting becomes effective by a circuit extending from (+) including, back contact 49 of relay 2AER, front contact 50 of relay 2H, front contact 51 of relay 2D, and lamp G of signal 2, to (−).

Figure 2C:
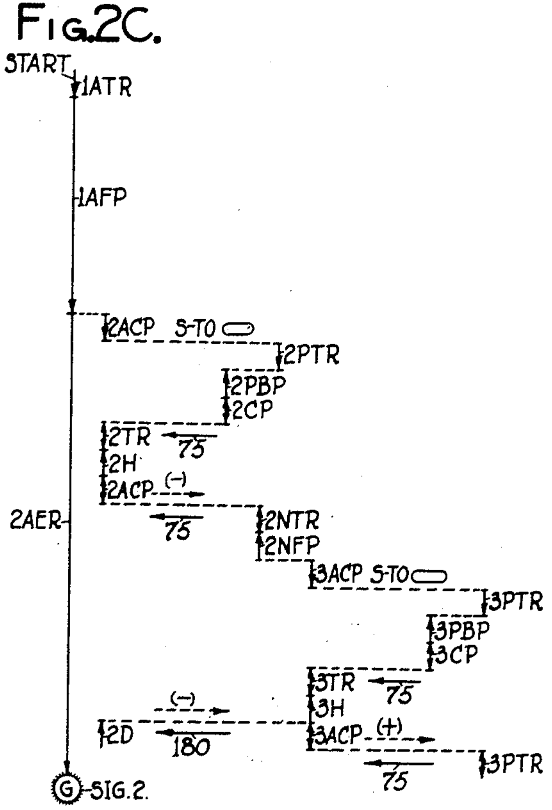
Figure 2D:
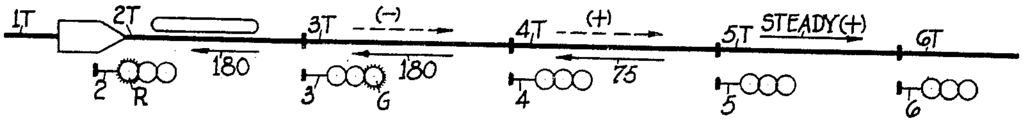
Figure 2E:
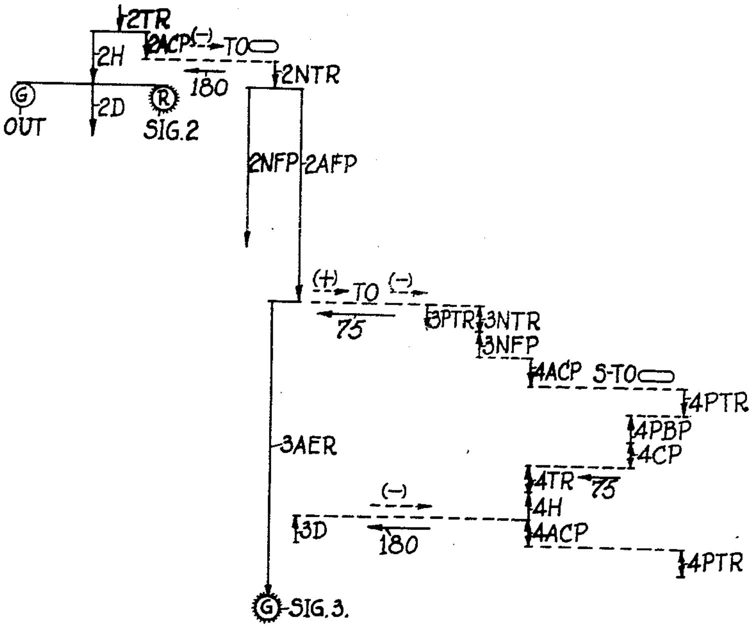
Figure 2F:
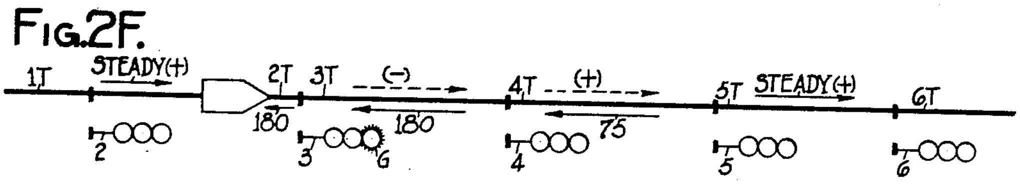

Having thus considered the manner in which coding is set up for the control of signal 2 when a train enters the stretch, consideration will now be given to the mode of operation as the train moves from block to block along the trackway so as to always maintain coding effective in two unoccupied blocks in advance of the train. The sequence of relay operations under these conditions is illustrated in Fig. 2E while the sequence of operations for the start of coding as has been described is illustrated in Fig. 2C. Thus it will be considered that a train accepts the clear indication of signal 2 and enters the block 2T as illustrated in the track diagram of Fig. 2D. By shunting the track rails of the block 2T, the track relay 2TR (see Fig. 1A) is dropped away and rendered inactive and thus the relay 2H is deenergized. The dropping away of relay 2H is effective by the shifting of its contact 50 to extinguish the green lamp G of signal 2 and energize the red lamp R of that signal according to the usual practice. The relay 2D is also dropped away because of the train shunt of the block 2T.

Upon the failure of the track relay 2TR to be responsive to the driven code because of the train shunt, the inverse code transmitter 2ACP becomes inactive, and the negative inverse code track relay 2NTR (see Fig. 1B) at the exit end of the track section 2T is rendered inactive. Because of the failure of this relay to pulse its contact 18, the relay 2AFP is deenergized and the negative repeater relay 2NFP becomes deenergized because of the failure of relay 2NTR to pulse contact 24.

After a time measured by the drop away time of the relay 2AFP, the shifting of contact 19 of relay 2AFP disconnects the track battery 36 and connects the track battery 52 in the coded track circuit for the block 3T so as to change the polarity of energization of the block 3T from positive to negative. Thus the inverse code transmitted from the entrance end of the block 3T is changed to negative polarity, and in accordance therewith, at the exit end of the block, the relay 3PTR (see Fig. 1C) is rendered inactive, but the closure of its back contacts 38 and 41 is effective to maintain the driven code transmitter relay 3CP active by the energization of circuits that have been described. The relay 3AFP is maintained picked up by the negative inverse code because of the pulsing of contact 53 of the relay 3NTR and the negative front repeater relay 3NFP at the exit end of the block 3T is picked up by the pulsing of contact 42. The picking up of this relay opens the circuit which has been steadily energized for the relay 4ACP at back contact 54 and thus removes the steady energy from the block 4T at its entrance end by the opening of front contact 55 of relay 4ACP.

At the exit end of the block 4T, the relay 4PTR (see Fig. 1D) which has been steadily energized is dropped away, and the dropping away of that relay, by the closure of its back contact 56 energizes the relay 4PBP to in turn initiate the oscillators 4—180CT and 4—75CT by the closure of front contact 57. The relay 4CP thus becomes active to transmit a 75 driven code which it applies by the pulsing of contact 58 to the track rails of the block 4T at the exit end thereof. The circuit by which the relay 4CP is energized for each pulse of the 75 code extends from (+) including, back contact 59 of relay 4PTR, back contact 60 of relay 4NTR, contact 61 of oscillator 4—75CT, back contact 62 of relay H, and winding of relay 4CP, to (−).

It will be noted that the relay 4AFP is deenergized upon the dropping away of the relay 4PTR by the opening of its circuit at front contact 56, but because of the slow drop away characteristics of this relay it is maintained picked up until there is time for the inverse code transmitter at the entrance end of the block 4T to be rendered active so as to pulse the relay 4PTR and thus provide intermittent energization for the relay 4AFP. Thus further propagation of starts of coded track circuits can be arrested by the application of inverse code of a positive polarity to the entrance end of the block 4T.

Upon receiving the 75 driven code at the entrance end of the block 4T, the relay 4TR (see Fig. 1C) becomes active, and the pulsing of its contacts 63 and 64 provides for the picking up of relay 4H in a manner comparable to that which has been described for the picking up of the relay 2H at the entrance end of block 2. With the relay 4H picked up, the relay 4ACP becomes active to transmit an inverse code of positive polarity because of the relay 3AFP being maintained picked up to close its front contact 74 to select that the battery 65 is used for the transmission of the inverse code. The circuit involved in the energization of the relay 4ACP for transmission of the inverse code extends from (+), including front contact 66 of relay 3NFP, back contact 63 of relay 4TR, front contact 67 of relay 4H, back contact 68 of relay 4TP, front contact 54 of relay 3NFP, front contact 69 of relay 3AFP, and winding of relay 4ACP, to (−).

Upon the reception of the inverse code of positive polarity at the right-hand end of the block 4T (see Fig. 1D), the relay 4PTR becomes active to pulse its contacts 56 and 59, thereby maintaining the code transmitter relay 4CP active for the transmission of the 75 driven code and at the same time maintaining the relay 4AFP picked up so as to maintain steady energization of the relay 5ACP, and thus steady energization is maintained for the block 5T at the entrance end thereof with a positive polarity as selected by the front contact 70 of relay 4AFP.

Because of the relay 4H having been picked up by the 75 driven code in the block 4T in advance thereof, its contact 44 is effective to select the contact 71 of the oscillator 3—180CT rather than the contact 43 of the oscillator 3—75CT to be effective to govern the code rate transmitted from the exit end of the block 3T. Thus the code rate is increased from a 75 to a 180 rate in the block 3T, and the reception of this 180 code at the entrance end of that block provides for the picking up of the relay 3D (see Fig. 1B) through through its tuned decoder 180DU to condition the signal 3 for the display of a green aspect when the approach lighting becomes effective.

Inasmuch as the block 2T is considered to be shunted by the train under the conditions being considered, the relay 2AFP has been dropped away to open its front contact 72, and because of the slow drop away characteristics of the approach lighting relay 3AER, that relay becomes dropped away at a time later that is sufficient to permit the code rate to build up from the 75 code to the 180 code as has been described so as to pick up the relay 3D and condition the green lamp G of signal 3 for energization. The relative drop away timing desirable for these relays 2AFP and 3AER is diagrammatically illustrated in Fig. 2E wherein it is illustrated that the approach lighting of the signal 3 is delayed by the successive drop away times of two slow drop away relays (relays 2AFP and 3AER) subsequent to the shunting of the track rails of the block 2 upon entrance of a train into that block. When the relay 3AER becomes dropped away, the green lamp of signal 3 is energized by a circuit extending from (+), including back contact 73 of relay 3AER, front contact 75 of relay 3H, front contact 76 of relay 3D, and the green lamp G of signal 3, to (−).

Figure 2G:
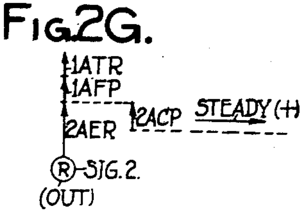

As the train progresses so as to leave the track section 1T unoccupied in the rear of the train, a sequence of operations becomes effective as illustrated diagrammatically in Fig. 2G whereby steady energization is applied at the entrance end of the block 2T in the rear of the train as a means for initiating the shutting down of the coding in the rear of the train as it progresses.

Thus when the train leaves the track section 1T, the track relay 1ATR is picked up, and the picking up of that relay is effective by the closure of its front contact 14 to energize the relay 1AFP which in turn selects the battery 10 to be connected to the track rails of the block 2T by the closure of its front contact 11. The picking up of this relay also closes an obvious circuit for the steady energization of the relay 2ACP at front contact 15, and the relay 2ACP in turn applies steady energization to the track rails at the entrance end of the block 2T by the closure of front contact 12. The closure of front contact 16 of relay 1AFP restores the approach lighting relay 2AER to its normal energized position, and the picking up of the relay 2AER completes the restoration to normal conditions of the apparatus of signal 2 by opening back contact 49 and thus extinguishing the red lamp R of signal 2.

As the train progresses further so as to leave the block 2T unoccupied, the relay 2PTR (see Fig. 1B) is picked up by the steady energy fed through the track rails from the entrance end of the block 2T. The picking up of this relay deenergizes the relay 2PBP by opening its circuit at back contact 17 and thus renders the code oscillator 2—180CT and 2—75CT inactive by the opening of front contact 22. The picking up of relay 2PTR renders the relay 2CP inactive in accordance with the opening of back contact 23.

The closure of front contact 17 of relay 2PTR reestablishes the circuit by which the relay 2AFP is normally energized, and the picking up of relay 2AFP is effective by the closure of its front contact 19 to select the track battery 36 as the battery from which steady energization of a positive polarity is to be applied to the track rails at the entrance end of the block 3T. The relay 2AFP in picking up also is effective by the closure of front contact 21 to reestablish a circuit for the relay 3ACP which has been described as being steadily energized under normal conditions. When relay 3ACP is picked up, the closure of its front contact 37 applies energy steadily to the track rails of the block 3T at its entrance end of a positive polarity as selected by the front contact 19 of the relay 2AFP. The approach lighting relay 3AER is restored to its normally energized position by the closure of front contact 72 of relay 2AFP, and the energization of this relay is effective by the opening of back contact 73 to extinguish the red lamp R of signal 3.

It will be noted that each of the decoding transformers is deenergized under normal conditions because of the relays NFP and AFP at that signal location being energized. Thus the decoding transformer at signal 3 is deenergized with the front contact 45 of relay 2NFP open and the back contact 72 of relay 2AFP open.

Having thus described the manner in which the code transmitters are shut down and the system is restored to its normal conditions for the block 2T as it becomes unoccupied in the rear of a train, it is to be understood that a similar mode of operation is effective for each of the blocks as a train progresses, and that when the system is thus restored it is conditioned so that the subsequent approach of a following train effects the same mode of operation as has been described for the initiation of coding.

It will be readily apparent that in cases where a following train is running less than three unoccupied blocks in the rear of a train in advance that there is no restoration to normal conditions for the unoccupied blocks in the rear of the first train as the presence of the following train is effective to govern the transmission of code in the blocks in advance thereof in a manner similar to the manner which has been specifically considered when considering the passage of only one train. If there is only one unoccupied block between the first and second trains, the code rate for the block in advance of the second train obviously cannot build up above a 75 code rate as selected by the deenergized relay H at the exit end of that block, and although a negative inverse code is transmitted in that block to call for initiation of coding in a block in advance, the presence of the first train in the block in advance renders that control effective only to prevent the application of steady energization in the block occupied by the first train and conditions the entrance end of that block so that coding will be continued in that block when it becomes unoccupied by the first train.

From the typical conditions that have been described, it will be readily apparent that as the train enters each block, the polarity of inverse code transmission in the next block in advance is changed from positive to negative and such change is effective to remove the steady energization from the second unoccupied block in advance and initiates the transmission of a 75 driven code from the exit end of that block. The reception of the 75 driven code at the entrance end of this block is effective both to increase the code rate in the block in the rear to a 180 rate, and to initiate the transmission of an inverse code of positive polarity in that block so as to arrest the propagation of starts for code transmitters until the train advances another block and changes the polarity of the inverse code transmission. Thus, generally speaking, it can be said that when a train enters a block, it initiates coding in a second unoccupied block in advance by changing the polarity of the inverse code in the first unoccupied block so as to pick up the negative front repeater relay NFP at the exit end of that block and thereby remove the steady energy from the second unoccupied block. It is the combination of lack of inverse code of negative polarity to pick up a relay NFP and the presence of inverse code of positive polarity to maintain a relay AFP energized that prevents further propagation of starts for the coders of the respective blocks beyond the second unoccupied block in advance of the train.

It is to be understood that there are a number of expedients that may be employed for the initiation of the normally inactive coded track circuit system provided by the present invention, particularly at the entrance to the equipped territory. In any case, well known approach control expedients may be employed to fit the conditions encountered in practice so as to clear the signal governing entrance to the territory, such as the signal 2 of Fig. 1A. The approach control of signal 2 as illustrated in Fig. 1A is particularly adapted for low speed train movements where only a caution indication is required for the next signal in the rear of the signal 2. If, however, high speed train movements are anticipated upon entrance to the coded track circuit equipped territory, coding in advance of signal 2 may be initiated either manually by a tower operator, or automatically by the entrance of a train into the second block in the rear of that signal so that the relay 2H can be picked up to provide for the transmission of a clear control to the next signal in the rear of signal 2 to govern the approach of the train.

If the signal 2 is to be considered as the leaving signal of an interlocking plant which is subject to manual control of a tower operator, a conventional manually controlled signal control relay for that signal can be used in place of the approach track relay 1ATR, to initiate the coding, such signal control relay being energized when the signal is to be cleared and being deenergized when the signal 2 is put to stop in the rear of a train. By this arrangement, a back contact of the signal control relay would be used instead of the front contact 14 of the relay 1ATR in the control of the pole changing relay 1AFP.

If there is a track switch connection to the stretch of track that is equipped with coded track circuits according to the present invention, the reversal of such track switch when proper authorization for such reversal has been granted is effective by shunting the track rails to remove the condition of steady energization of the associated block and thereby initiate coding in two blocks in advance and govern the clearing of a signal for the passage of a train subsequent to its movement out of the track switch. The initiation of coding under these conditions is accomplished by a mode of operation comparable to that which has been described for the initiation of coding upon the entrance of a train into the approach track section IT.

It will be readily recognized that other means may be employed for governing the initiation of code transmitters for the respective blocks in advance of a train as it progresses in combination with the feature of the present invention that delays the energization of the signal lamps until the code has had time to be built up to a rate for governing display of the least restrictive aspect of the signal for which the approach control is provided. Thus, this approach control feature may be readily applied, for example, to the systems disclosed in my above mentioned prior application. It is also to be understood that the system disclosed in this embodiment of the present invention may be modified as required in practice to provide for four block signalling indications.

Having thus described a coded track circuit signalling system for a typical stretch of track as one embodiment of the present invention, it is desired to be understood that this form is selected to facilitate the disclosure of the invention rather than to limit the number of forms which the invention may assume, and it is to be further understood that various adaptations, alterations, and modifications may be applied to the specific form shown to meet the requirements of practice without in any manner departing from the spirit or scope of the present invention except as limited by the appending claims.

What I claim is:

1. A coded track circuit signalling system for a stretch of railway track divided into blocks and having a signal governing entrance to each block for a given direction of traffic comprising in combination, a coded track circuit for each of the blocks having code transmitting and receiving apparatus at each end of the associated block, said code transmitting apparatus being normally inactive but being initiated when its associated block is a predetermined number of blocks in advance of an approaching train, approach control means associated with each of the blocks responsive to the presence of a train in that block for initiating said code transmitting apparatus at the exit end of another block in advance, and a slow acting approach lighting relay for each of the signals operable in response to said approach control means for the block in the rear for energizing its associated signal, said slow acting relay being effective to initially energize its associated signal upon entrance of a train into said block in the rear, only provided there has been time for the initiation of coding in another block in advance in response to said approach control means so as to condition the associated signal to give a clear indication when energized.

2. In a coded track circuit signalling system for a stretch of railway track divided into blocks and having a signal governing entrance to each block for a given direction of traffic, the combination with a coded track circuit for each of the blocks having normally inactive code transmitting and receiving means at each end thereof, of an approach track relay at the exit end of each of the blocks energized over the track rails by energy fed from said transmitting means at the entrance end of that block, a slow acting approach repeater relay energized by said approach track relay and effective when deenergized to initiate said code transmitting means for another block in advance, and a slow acting approach lighting relay for each of the signals normally energized by said approach repeater relay effective when dropped away to energize its associated signal, said approach lighting relay being sufficiently slow in dropping away to allow time for initiation of coding in another block in advance and for the code rate to increase as a result thereof in the block immediately in advance of that signal to its rate for governing the least restrictive signal indication.

3. In a coded track circuit signalling system for a stretch of railway track having adjoining blocks and having a signal governing entrance to each block for a given direction of traffic, the combination with a coded track circuit for each of the blocks having normally inactive code transmitting and receiving means at each end thereof and having means at its entrance end for applying energy of a selected polarity, of respective oppositely poled approach track relays at the exit end of each of the blocks energized by energy fed from said transmitting means at the entrance end of that block, a slow acting approach repeater relay energized when either of said approach track relays is active, said approach repeater relay being effective when energized to select the polarity of energization for the track rails of the block in advance, and a slow acting approach lighting relay for each of the signals normally energized by said approach repeater relay and effective when dropped away to energize its associated signal, said approach lighting relay being sufficiently slow in dropping away to allow time for initiation of coding in a block in advance in response to said approach repeater relay.

4. A coded track circuit signalling system for a stretch of railway track divided into blocks and having a signal governing entrance to each block for a given direction of traffic, a coded track circuit for each of the blocks having code transmitting and receiving apparatus at the respective entrance and exit ends thereof, said code transmitting apparatus at the entrance ends being normally effective to steadily energize the track rails with a given polarity but at other times to transmit an inverse code of a selected polarity, said code receiving means at the exit end comprising oppositely poled code following relays respectively responsive to code pulses transmitted through the track rails of their particular polarities, a pole changing relay at each signal energized in response to the energization of either of said code following relays and effective to select the polarity for energization of the track rails for the block in advance, said pole changing relay also being effective when deenergized to remove the steady energy from the block in advance, approach control means at each signal responsive to the pulsing of a particular one of said code following relays for removing steady energy from the next block in advance, and thereby initiating coding in that block, and slow-acting approach lighting means for each signal effective to approach light that signal a predetermined time subsequent to initiation of coding in a block in advance in accordance with the deenergization of said pole changing relay.

5. In a coded track circuit signalling system having a plurality of normally inactive coded track circuits for governing the indications of respective signals for a given direction of traffic, normally inactive code transmitting and receiving apparatus at the respective entrance and exit ends of each of said track circuits, said code receiving apparatus at the entrance end of each track circuit comprising a code following track relay and a decoding transformer having its primary winding energized first in one direction and then the other by the pulsing of a contact of said code following track relay and having a slow-acting relay energized by its secondary winding, and automatic initiating apparatus for rendering said coded track circuits active in advance of a train one at a time as the train progresses from one track circuit to the next, said initiating apparatus being effective to maintain said primary winding of said decoding transformer deenergized except when a train is within a predetermined number of track circuits of the track circuit with which such means is associated.

6. A coded track circuit signalling system for a stretch of railway track divided into blocks and having a signal for governing entrance to each of the blocks for a given direction of traffic comprising in combination, a coded track circuit for each of the blocks having code transmitting and code receiving apparatus at each end of the block, said code transmitting apparatus at the exit end being normally inactive but being effective when rendered active to transmit a driven code, said code transmitting apparatus at the entrance end being normally effective to apply steady energy of a given polarity to the coded track circuit of that block and being effective to remove such steady energy and apply inverse code of said given polarity during the off periods of driven code transmitted from the opposite end of the block in response to a change to the opposite polarity of energy transmitted from the entrance end of the next block in the rear, said code transmitting apparatus at the exit end being rendered active to transmit a selected driven code in response to cessation of steady energy transmitted from the entrance end of that block, except when such steady energy is replaced by the transmission of inverse code of said given polarity, and pole changing means at each signal responsive to a train shunting inverse code transmitted from the entrance end of the next block in the rear for changing the polarity of inverse code pulse transmission in the next block in advance to said opposite polarity and thereby initiate driven code transmission from the exit end of the second block in advance of that signal.

WADE H. REICHARD.

References Cited in the file of this patent

UNITED STATES PATENTS

| Number | Name | Date |
|---|---|---|
| 1,887,261 | Failor | Nov. 8, 1932 |
| 2,122,373 | Hormats | June 28, 1938 |
| 2,275,838 | Blosser | Mar. 10, 1942 |
| 2,335,765 | Judge | Nov. 30, 1943 |
| 2,519,979 | Preston | Aug. 22, 1950 |